(12) United States Patent
Weingarten

(10) Patent No.: US 9,194,507 B2
(45) Date of Patent: Nov. 24, 2015

(54) AIR RELEASE VALVE WITH ELASTIC ROLLING SHUTTER

(71) Applicant: Bermad CS Ltd., Evron (IL)

(72) Inventor: Zvi Weingarten, Evron (IL)

(73) Assignee: Bermad CS Ltd., Evron (IL)

( * ) Notice: Subject to any disclaimer, the term of this patent is extended or adjusted under 35 U.S.C. 154(b) by 0 days.

(21) Appl. No.: 13/928,448

(22) Filed: Jun. 27, 2013

(65) Prior Publication Data
US 2015/0000754 A1    Jan. 1, 2015

(51) Int. Cl.
F16K 24/04 (2006.01)
F16K 15/14 (2006.01)
F16K 7/12 (2006.01)
(Continued)

(52) U.S. Cl.
CPC ............ *F16K 24/04* (2013.01); *F16K 15/148* (2013.01); *F16K 1/526* (2013.01); *F16K 7/123* (2013.01); *F16K 7/126* (2013.01); *F16K 7/14* (2013.01); *F16K 7/17* (2013.01); *F16K 24/042* (2013.01); *G05D 7/012* (2013.01); *Y10T 137/0396* (2015.04); *Y10T 137/3099* (2015.04); *Y10T 137/7869* (2015.04)

(58) Field of Classification Search
CPC ......... F16K 15/14; F16K 15/148; F16K 7/00; F16K 7/12; F16K 7/123; F16K 7/126; F16K 7/14; F16K 7/17; F16K 24/00; F16K 24/04; F16K 24/042; F16K 24/06; F16K 1/52; F16K 1/526; G05D 7/012
USPC ......... 137/171, 197–199, 202, 207, 854, 497, 137/460, 504, 517, 315.33, 484.2, 484.4, 137/484.6, 511, 512.1, 513.5, 516.11, 137/516.13, 516.15, 516.17, 516.19, 843, 137/852, 855; 251/120, 12, 336; 138/43, 138/45, 46
See application file for complete search history.

(56) References Cited

U.S. PATENT DOCUMENTS
2,489,932 A    11/1949    Rosenblum
2,777,464 A    1/1957    Mosely
(Continued)

FOREIGN PATENT DOCUMENTS
FR    1217791    5/1960
FR    2570158 A1 *  3/1986
GB    783323    9/1957

OTHER PUBLICATIONS
Machine translation for FR 2570158 A1.*

*Primary Examiner* — Jessica Cahill
*Assistant Examiner* — Ian Paquette
(74) *Attorney, Agent, or Firm* — Mark M. Friedman

(57) ABSTRACT

An air release vent valve used to vent air from a liquid filled pipeline, the air release vent valve having a float valve deployed in a float valve housing extending from the pipeline and a surge suppressing shutter valve deployed in a vent passageway extending from said float valve housing such that said surge suppressing shutter valve is downstream from said float valve. The surge suppressing shutter valve includes an elastic shutter element that is pre-shaped to a normally open position and is configured to gradually deform to a closed position as a velocity of air flowing through said vent passageway increase so as to dampen the force of the closure of air release vent valve and prevent a pressure surge within the pipeline. Once a liquid level in the pipeline reaches the float valve, a float is raised so as to fully closes the vent passageway.

10 Claims, 2 Drawing Sheets

(51) Int. Cl.
 *F16K 7/14* (2006.01)
 *F16K 7/17* (2006.01)
 *F16K 1/52* (2006.01)
 *G05D 7/01* (2006.01)

(56) References Cited

U.S. PATENT DOCUMENTS

| | | | |
|---|---|---|---|
| 2,851,060 A | | 9/1958 | Fleischer et al. |
| 2,899,981 A | | 8/1959 | Binks |
| 3,949,780 A | * | 4/1976 | Buckman ............ 137/854 |
| 4,609,014 A | * | 9/1986 | Jurjevic et al. ............ 138/45 |
| 4,712,574 A | * | 12/1987 | Perrott ............ 137/217 |
| 4,938,259 A | * | 7/1990 | Schmidt ............ 138/45 |
| 5,469,883 A | | 11/1995 | Lee |
| 5,860,449 A | * | 1/1999 | Schulte ............ 137/550 |
| 8,167,002 B2 | * | 5/2012 | Kuhne et al. ............ 138/45 |
| 2010/0319784 A1 | | 12/2010 | Kuhne et al. |
| 2011/0146811 A1 | | 6/2011 | Miller |
| 2012/0037834 A1 | * | 2/2012 | Lang et al. ............ 251/368 |
| 2012/0216879 A1 | * | 8/2012 | Heimann et al. ............ 137/202 |
| 2013/0092254 A1 | | 4/2013 | Weingarten |
| 2013/0220442 A1 | * | 8/2013 | Balutto ............ 137/202 |

* cited by examiner

FIG. 2
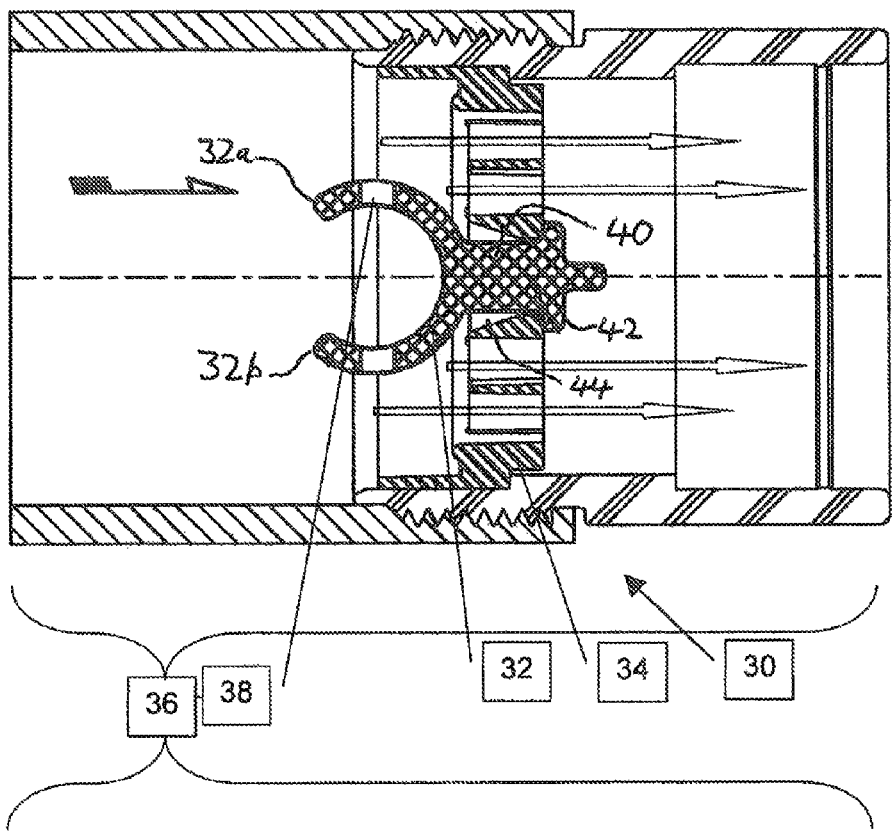
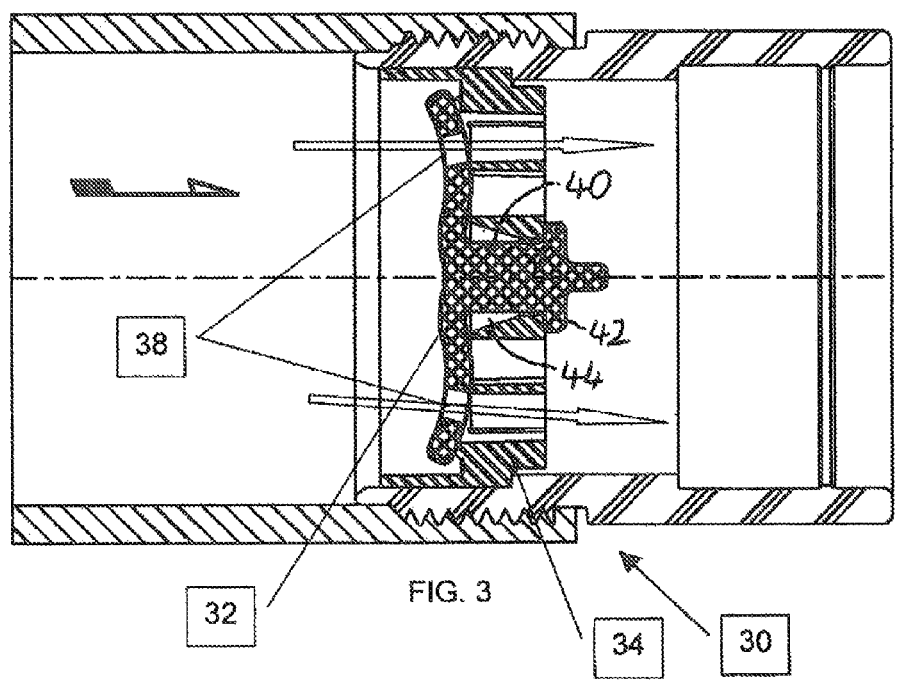
FIG. 3

AIR RELEASE VALVE WITH ELASTIC ROLLING SHUTTER

FIELD AND BACKGROUND OF THE INVENTION

The present invention relates to pipeline air release vent valves and, in particular, it concerns a pipeline air release vent valve having an elastic rolling shutter that closes gradually to prevent air valve pressure surges.

As a consequence of filling a pipeline with liquid, such as water, the air in the pipeline is vented through air release vent valves. During this process the trapped air is compressed and vents through the air release vent valve at a progressively higher velocity air flow.

It is known that the sudden stoppage of water flow as a common air release vent valve closes may create a distractive pressure surge.

Staging the closing process of the air release vent valve prevents the potential for pressure surges. Such staging provides a higher capacity air venting during a first stage and a low capacity air venting during a second stage.

The air release vent valve closes completely when the liquid level reaches the air valve float assembly and seals the (Kinetic and Automatic orifices) of the air release vent valve.

However, the sudden closing of a common rigid anti surge first stage large disc, as is the current solution for first stage closing, still causes a sharp pressure rise and potential damage to the valve and seal.

There is therefore a need for an air release vent valve having an elastic rolling shutter that closes gradually to prevent air valve pressure surges.

SUMMARY OF THE INVENTION

The present invention is an air release vent valve having an elastic rolling shutter that closes gradually to prevent air valve pressure surges.

According to the teachings of the present invention there is provided, a surge suppressing shutter valve used to vent air from a liquid filled pipeline, the surge suppressing shutter valve comprising an elastic shutter element deployed in a vent passageway extending from the pipeline, the elastic shutter element is pre-shaped to a normally open position and is configured to gradually deform to a closed position as a velocity of air flowing through the vent passageway increases so as to dampen the force of the closure and prevent a pressure surge within the pipeline.

According to a further teaching of the present invention, the elastic shutter element is configured such that the pre-shaped to a normally open position includes a "U" shaped cross-sectional contour.

According to a further teaching of the present invention, the elastic shutter element is deployed in the vent passageway with its U shape opening facing toward a direction of air flow through the vent passageway.

According to a further teaching of the present invention, the elastic shutter element is mounted on and held in place by a support structure deployed in the vent passageway.

According to a further teaching of the present invention, the elastic shutter element is configured with at least one secondary orifice throughbore, such that the closed position of the elastic shutter element at least partially closes the vent passageway.

According to a further teaching of the present invention, the surge suppressing shutter valve is used in conjunction with a float valve such that once a liquid level in the pipeline reaches the float valve, a float is raised so as to fully close the vent passageway.

There is also provided according to the teachings of the present invention, an air release vent valve used to vent air from a liquid filled pipeline, the air release vent valve comprising: (a) a float valve deployed in a float valve housing extending from the pipeline; and (b) a surge suppressing shutter valve deployed in a vent passageway extending from the float valve housing such that the surge suppressing shutter valve is downstream from the float valve, the surge suppressing shutter valve including an elastic shutter element that is pre-shaped to a normally open position and is configured to gradually deform to a closed position as a velocity of air flowing through the vent passageway increase so as to dampen the force of the closure of air release vent valve and prevent a pressure surge within the pipeline.

According to a further teaching of the present invention, the elastic shutter element is configured such that the pre-shaped to a normally open position includes a "U" shaped cross-sectional contour.

According to a further teaching of the present invention, the elastic shutter element is configured with at least one secondary orifice throughbore, such that the closed position of the elastic shutter element at least partially closes the vent passageway.

According to a further teaching of the present invention, the float valve is configured such that such that once a liquid level in the pipeline reaches the float valve, a float is raised so as to fully close the vent passageway.

There is also provided according to the teachings of the present invention, a method of venting air from a liquid filled pipeline, the method comprising: (a) providing surge suppressing shutter valve comprising an elastic shutter element deployed in a vent passageway extending from the pipeline, the elastic shutter element being pre-shaped to a normally open position and configured to gradually deform to a closed position as a velocity of air flowing from the pipeline and through the vent passageway increases, so as to dampen the force of the closure and prevent a pressure surge within the pipeline; and (b) establishing a flow of liquid through the pipeline; wherein as the velocity of air flowing from the pipeline and through the vent passageway reaches a predetermined value the elastic shutter element gradually deforms from the pre-shaped normally open position to the closed position.

According to a further teaching of the present invention, the elastic shutter element is implemented such that the pre-shaped to a normally open position includes a "U" shaped cross-sectional contour.

According to a further teaching of the present invention, there is also provided deploying the elastic shutter element in the vent passageway with its U shape opening facing toward a direction of air flow through the vent passageway.

According to a further teaching of the present invention, there is also provided at least one secondary orifice throughbore in the elastic shutter element, such that the closed position of the elastic shutter element at least partially closes the vent passageway.

According to a further teaching of the present invention, there is also provided a float valve used in conjunction with the surge suppressing shutter valve such that once a liquid level in the pipeline reaches the float valve, a float is raised so as to fully close the vent passageway.

BRIEF DESCRIPTION OF THE DRAWINGS

The invention is herein described, by way of example only, with reference to the accompanying drawings, wherein:

FIG. 2 is a side elevation of the an elastic rolling shutter constructed and operational according to the teaching of the present invention, shown here is the open position; and FIG. 3 is a side elevation of the elastic rolling shutter of FIG. 2, shown here is the closed position.

DESCRIPTION OF THE PREFERRED EMBODIMENTS

Figure 1:
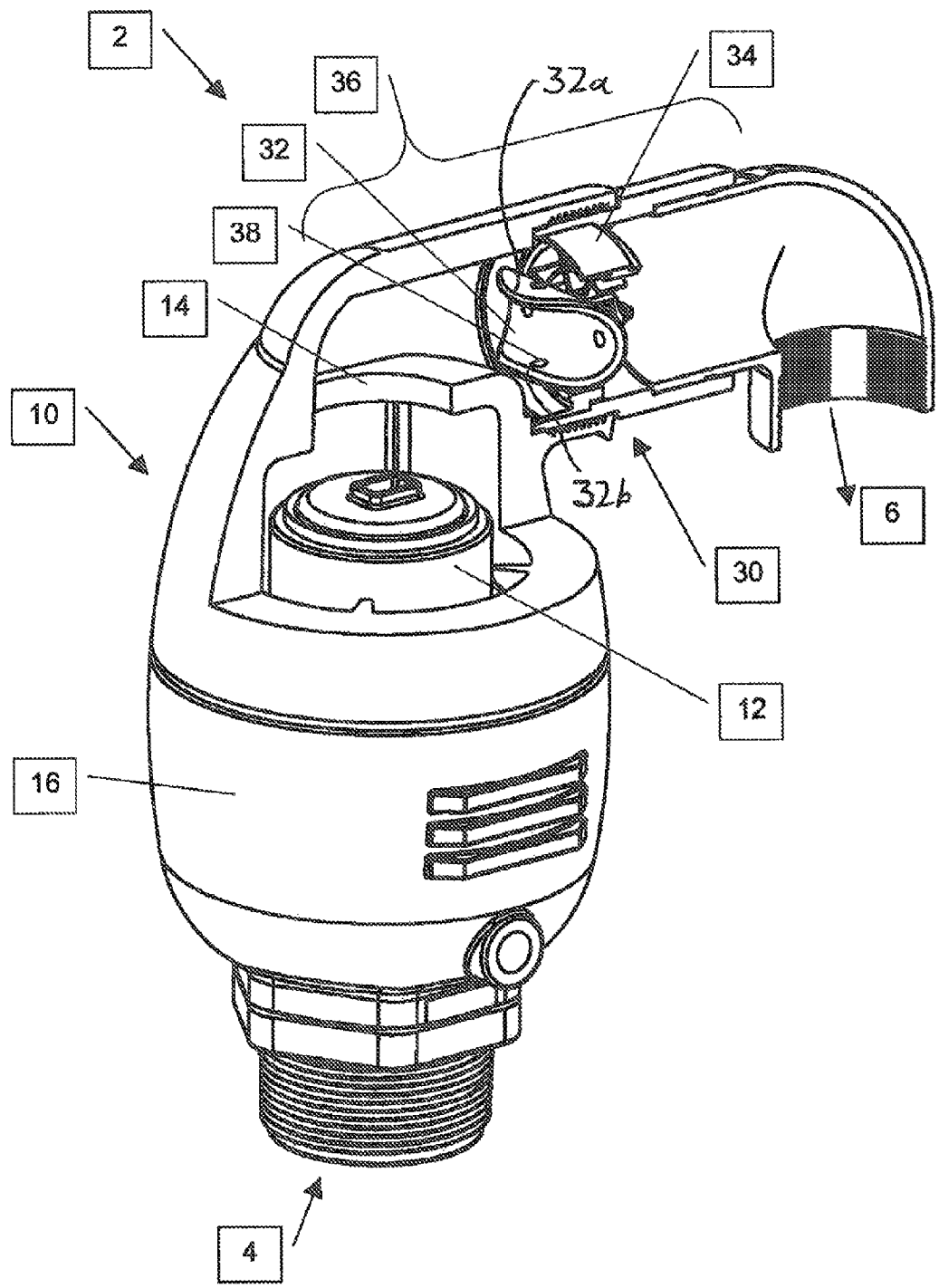
FIG. 1 is a partially cut-away isometric view of an air release vent valve constructed and operational according to the teaching of the present invention.

The present invention is an air release vent valve having an elastic rolling shutter that closes gradually to prevent air valve pressure surges.

The principles and operation of an air release vent valve having an elastic rolling shutter according to the present invention may be better understood with reference to the drawings and the accompanying description.

By way of introduction, the air release vent valve of the present invention includes a substantially common float valve that works in conjunction with a surge suppressing shutter valve. The shutter valve is configured to close gradually as the velocity of the air flowing through the valve increase so as to dampen the force of the closure and prevent a pressure surge in the pipeline that can be caused by a sudden closure. Once the liquid level in the pipeline reaches the float valve, the float is raised so as to fully close the valve.

The elastic shutter element is pre-shaped to a normally open position. As the air valve venting airflow velocity reaches a predetermine value, the aerodynamic conditions overcome the elastic force that holds the shutter element open and the shutter element is gradually deformed until the vent passageway of the air release vent valve is at least partially closed thereby closing the first stage of surge prevention.

The second stage air venting continues in order to allow air to continue venting, albeit at a lower rate. Therefore, at least one orifice of a predetermined size remains open to air flow.

As mentioned above, the air valve closes completely when the liquid in the pipeline reaches the air release vent valve and raises a float the inner float assembly and automatically seals the air valve Kinetic orifice.

Referring now to the drawings, FIG. 1 illustrates a preferred embodiment of the air release vent valve 2 of the present invention. As mentioned above, air release vent valve 2 includes a substantially common float valve 10 that works in conjunction with a surge suppressing shutter valve 30 that is deployed downstream from float valve 10 that is deployed in float valve housing 16. As illustrated, air release vent valve 2 is configured with an inlet 4 for connection to the pipeline and an outlet 6. It will be understood therefore, that air release vent valve 2 is configured to extend from the pipeline.

As the pipeline is filled with liquid, air is vented passed the kinetic float 12, which is held in an open position by gravity, through the kinetic orifice 14 and into the region of the shutter valve 30 in the vent passageway 36 that extends from the float valve housing 16.

FIGS. 2 and 3 illustrate the operation of shutter valve 30. FIG. 2 illustrates elastic shutter element 32 in a normally open arrangement, while FIG. 3 illustrates elastic shutter element 32 in a closed arrangement.

The elastic shutter element 32 is mounted on and held in place by a support structure 34. As illustrated here, the cross-section of the pipe in which the shutter valve is deployed in circular, therefore, elastic shutter element 32 is configured as a substantially circular disc. It will be appreciated, however, that the region in which the shutter valve is deployed may be configured with a cross-sectional contour other than circular such as, by not limited to, oval, rectangle, triangle and/or substantially any suitable closed curve. In such an embodiment, the elastic shutter element 32 may be configured with a suitable corresponding outside contour.

As stated above, elastic shutter element 32 is pre-shaped to an open position which is illustrated herein as a "U" shaped cross-sectional contour. However, this is not intended as a limitation and it will he understood that other shapes such as, but not limited to. a "V" are within the scope of the present invention. Most preferably, as best seen in FIG. 2, the extremities 32a and 32b of the "U" shape are reentrant, i.e. turn inwards, towards each other.

As seen in FIGS. 2 and 3, elastic shutter element 32 is integrally formed with a projecting plug 40 with an oversized flexible head portion 42 configured for snap-fitting into a corresponding aperture 44 of support structure 34. Aperture 44 is formed with a conical internal surface to facilitate insertion of oversized flexible head portion 42.

Elastic shutter element 32 is deployed with the "U" shape facing the air flow stream (arrows in FIGS. 2 and 3). As the airflow velocity flowing passed elastic shutter element 32 reaches a predetermine value, the aerodynamic conditions overcome the elastic force that holds elastic shutter element 32 in the open arrangement of FIG. 2 and elastic shutter element 32 is gradually deformed until attaining the closed arrangement of FIG. 3, at which time vent passageway 36 of air release vent valve 2 is at least partially closed, thereby closing the first stage of surge prevention.

It should be noted that the partial closure of vent passageway 36 is achieved here by providing an elastic shutter element 32 having an outer circumference that is substantially equal to the inner diameter of vent passageway 36. Elastic shutter element 32 is therefore configured with at least one secondary orifice throughbore 38 illustrated here as a plurality of four secondary orifices 38. It will be appreciated that the size and number of the secondary orifices 38 may be varied as necessary dependent on the specific requirements of the application in which the air release vent valve 2 is employed.

It will be readily understood, however, that elastic shutter element 32 may be configured as an element that does not completely cover the cross-section of the vent passageway. A further alternative may be that elastic shutter element 32 may be configured as an element that does completely cover the cross-section of the vent passageway and the secondary orifices may be configured as smaller passages formed in the sidewall of the vent passageway housing for example.

It is important to note that the underlying principle of the shutter valve 30 of the present invention is that the normally open elastic shutter element "rolls" (deforms) gradually to a substantially flat closed position so as to progressively block the air venting passage thereby softening the closing process and preventing a pressure surge and seal damage.

It will be readily appreciated that the elastic force which keeps the elastic shutter element in its normally open shape is predetermined and may be set and managed by the stiffness and thickness profile of the material used to produce the elastic shutter element. Additional and/or alternative methods to control the shape, stiffness and/or thickness profile of the elastic shutter element may include, but not limited to, addition of a set of stiffening ribs on the shutter element.

It will be appreciated that the above descriptions are intended only to serve as examples and that many other embodiments are possible within the spirit and the scope of the present invention.

What is claimed is:

1. A surge suppressing shutter valve used to vent air from a liquid filled pipeline, the surge suppressing shutter valve comprising an elastic shutter element deployed in a vent passageway extending from the pipeline, said elastic shutter element being pre-shaped to a normally open position and configured to gradually deform to a closed position as a velocity of air flowing through said vent passageway increases, so as to dampen the force of the closure and prevent a pressure surge within the pipeline, wherein said elastic shutter element is configured to progressively close said vent passageway such that said shutter valve provides a first stage of air venting in which increasing pressure difference across the shutter valve results in a first maximum flow rate through the shutter valve, and such that a further increase in pressure difference across the shutter valve brings said elastic shutter element to said closed position, resulting in a second stage of air venting having a lower flow rate than said first maximum flow rate, wherein said elastic shutter element is configured such that said pre-shaped normally open position includes a "U" shaped cross-sectional contour with reentrant extremities.

2. The surge suppressing shutter valve of claim 1, wherein said elastic shutter element is deployed in said vent passageway with its U shape opening facing toward a direction of air flow through said vent passageway.

3. The surge suppressing shutter valve of claim 1, wherein said elastic shutter element is configured with at least one secondary orifice throughbore, such that said closed position of said elastic shutter element at least partially closes said vent passageway.

4. The surge suppressing shutter valve of claim 3, wherein the surge suppressing shutter valve is used in conjunction with a float valve such that once a liquid level in the pipeline reaches said float valve, a float is raised so as to fully close said vent passageway.

5. An air release vent valve used to vent air from a liquid filled pipeline, the air release vent valve comprising:
(a) a float valve deployed in a float valve housing extending from the pipeline; and
(b) the surge suppressing shutter valve of claim 1 deployed in said vent passageway extending from said float valve housing such that said surge suppressing shutter valve is downstream from said float valve.

6. The air release vent valve of claim 5, wherein said float valve is configured such that, once a liquid level in the pipeline reaches said float valve, a float is raised so as to fully close said vent passageway.

7. A method of venting air from a liquid filled pipeline, the method comprising:
(a) providing surge suppressing shutter valve comprising an elastic shutter element deployed in a vent passageway extending from the pipeline, said elastic shutter element being pre-shaped to a normally open position and configured to gradually deform to a closed position as a velocity of air flowing from the pipeline and through said vent passageway increases, so as to dampen the force of the closure and prevent a pressure surge within the pipeline; and
(b) establishing a flow of liquid through the pipeline wherein as said velocity of air flowing from the pipeline and through said vent passageway reaches a predetermined value said elastic shutter element gradually deforms from said pre-shaped normally open position to said closed position, and wherein said elastic shutter element is configured to progressively close said vent passageway such that said shutter valve provides a first stage of air venting in which increasing pressure difference across the shutter valve results in a first maximum flow rate through the shutter valve and such that a further increase in pressure difference across the shutter valve brings said elastic shutter element to said closed position, resulting in a second stage of air venting having a lower flow rate than said first maximum flow rate, wherein said elastic shutter element is implemented such that said pre-shaped to a normal pen position includes a "U" shaped cross-sectional contour with reentrant extremities.

8. The method of claim 7 further including deploying said elastic shutter element in said vent passageway with its U shape opening facing toward a direction of air flow through said vent passageway.

9. The method of claim 7, further including providing at least one secondary orifice throughbore in said elastic shutter element, such that said closed position of said elastic shutter element at least partially closes said vent passageway.

10. The method of claim 7, further including providing a float valve used in conjunction with said surge suppressing shutter valve such that once a liquid level in the pipeline reaches said float valve, a float is raised so as to fully close said vent passageway.

* * * * *